United States Patent [19]
Abels

[11] Patent Number: 5,861,569
[45] Date of Patent: Jan. 19, 1999

[54] COMBAT VEHICLE WITH DIESEL-ELECTRIC DRIVE MECHANISM AND REAR HATCH

[75] Inventor: Frank O. Abels, Munster, Germany

[73] Assignee: Firma Wegmann & Co. GmbH, Kassel, Germany

[21] Appl. No.: 914,468

[22] Filed: Aug. 19, 1997

[30] Foreign Application Priority Data

Aug. 20, 1996 [DE] Germany .................. 196 33 329.6

[51] Int. Cl.⁶ .................................................. F41H 7/02
[52] U.S. Cl. .................. 89/36.08; 89/36.07; 180/65.3; 180/65.4; 180/69.6
[58] Field of Search ................ 89/36.08, 36.07; 180/65.3, 65.4, 69.6

[56] References Cited

U.S. PATENT DOCUMENTS

| | | | |
|---|---|---|---|
| 4,492,282 | 1/1985 | Appelblatt et al. | 180/68.1 |
| 4,607,562 | 8/1986 | LeBlanc | 89/40.03 |
| 4,998,591 | 3/1991 | Zaunberger | 180/6.44 |
| 5,490,314 | 2/1996 | Riddle | 29/401.1 |

*Primary Examiner*—J. Woodrow Eldred
*Attorney, Agent, or Firm*—Sprung Kramer Schaefer & Briscoe

[57] ABSTRACT

A combat vehicle with a rear hatch and a track powered by a diesel-electric drive mechanism in the rear. The drive mechanism includes separate motors that drive the track and several current-generating diesel-electric aggregates, each in the form of a generator powered by a diesel engine. The diesel-electric aggregates are positioned symmetrically to the longitudinal axis of the vehicle and above the track cover, leaving a passage between the inside of the vehicle and the hatch. The passage is either open or can be opened or expanded by moving the diesel-electric aggregates.

10 Claims, 6 Drawing Sheets

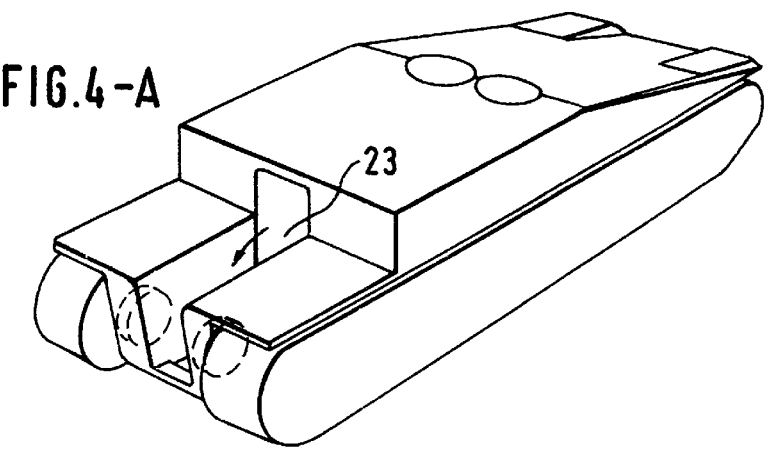
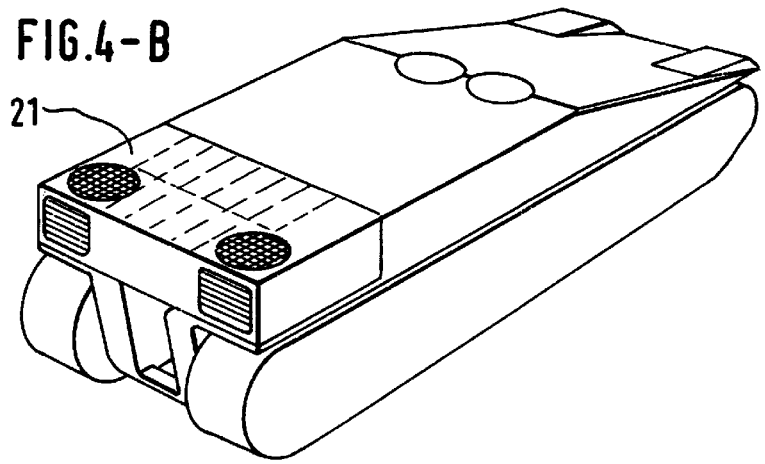
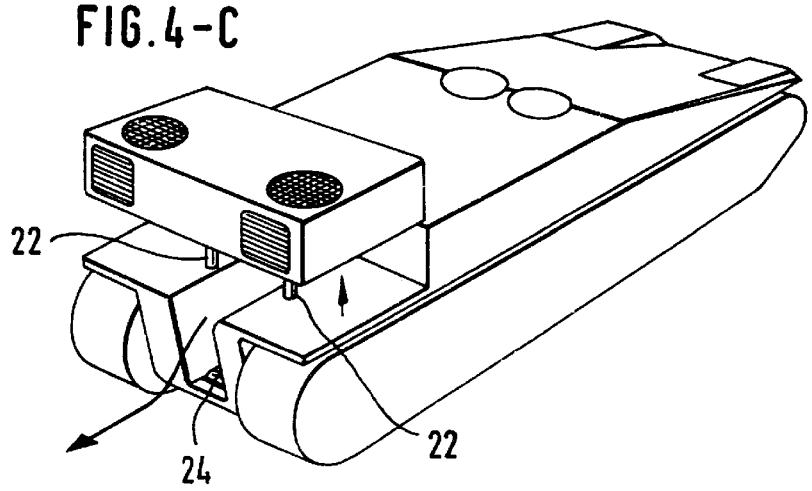

FIG.5-A
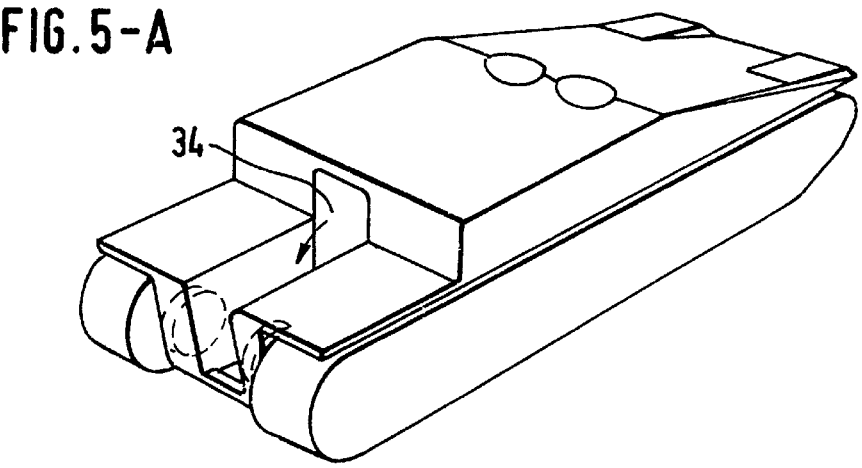
FIG.5-B
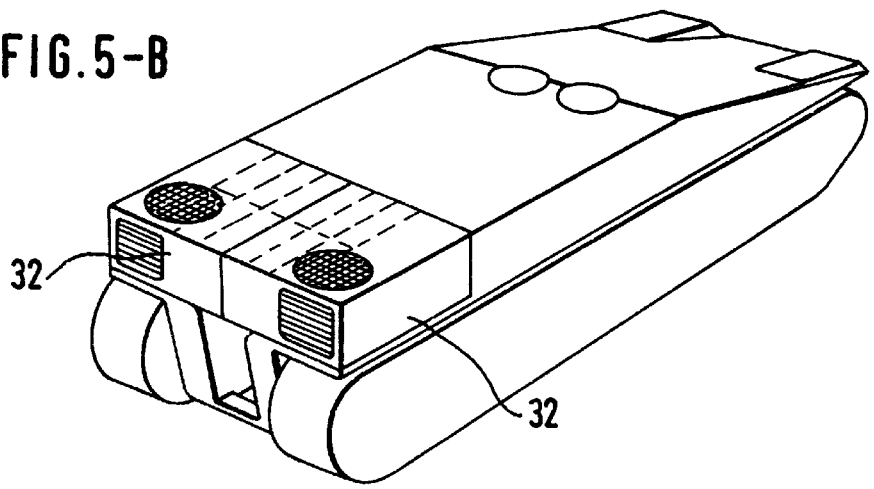
FIG.5-C
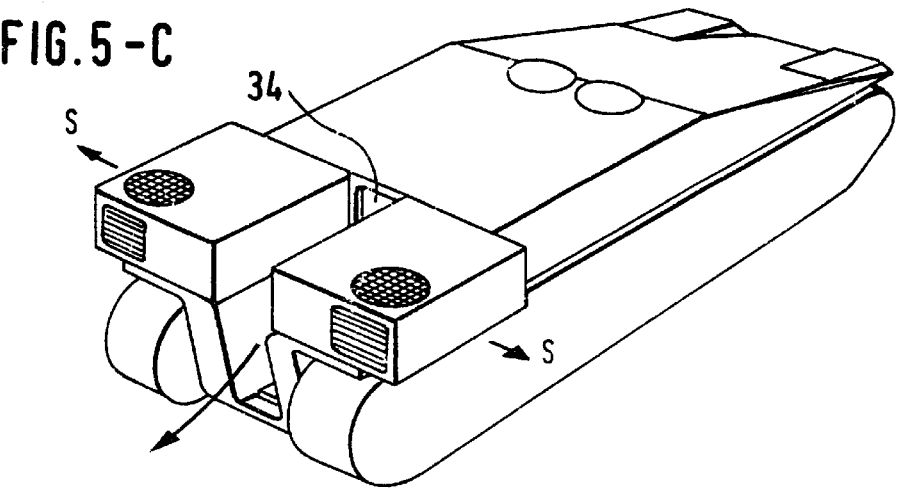

FIG.6-A
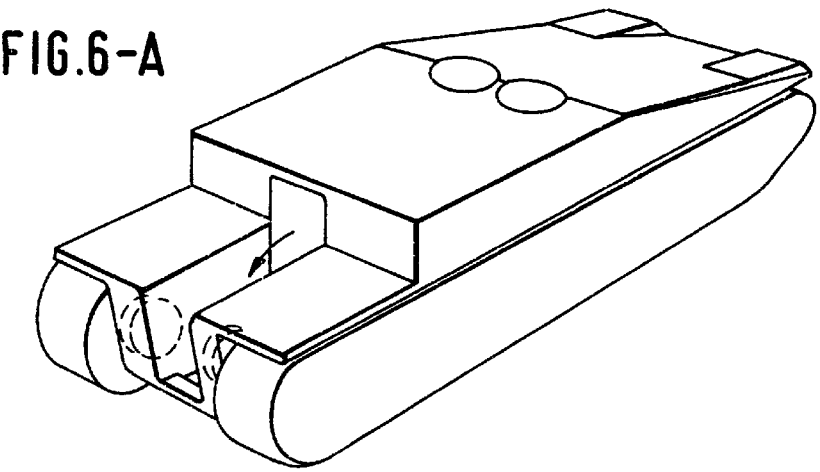
FIG.6-B
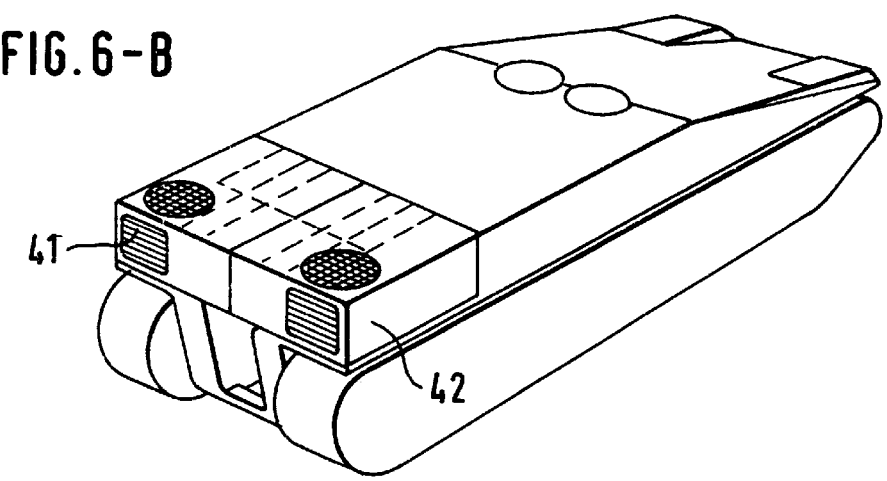
FIG.6-C
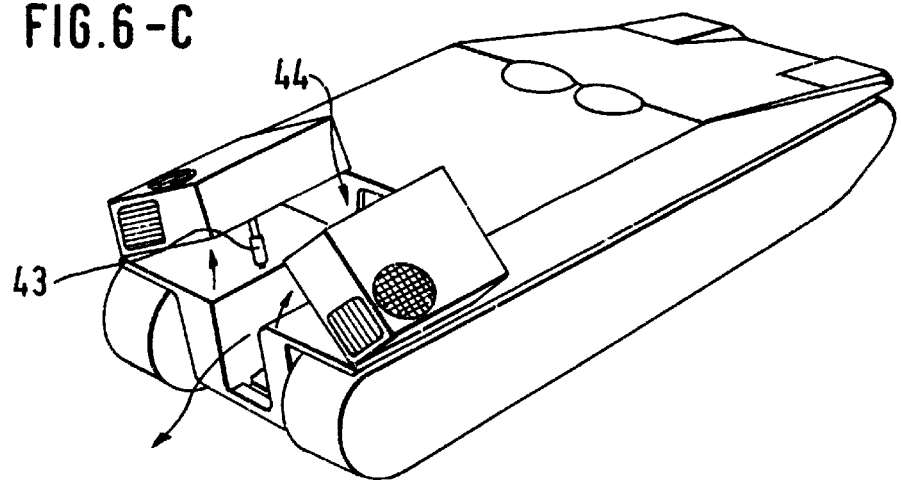

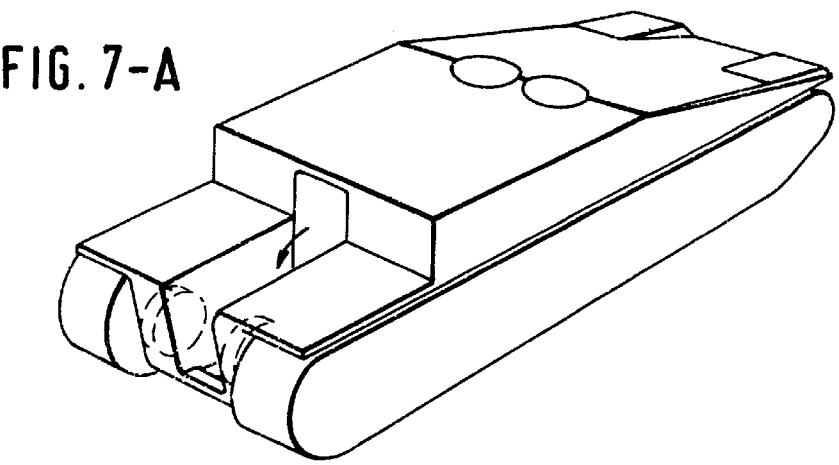
FIG. 7-A
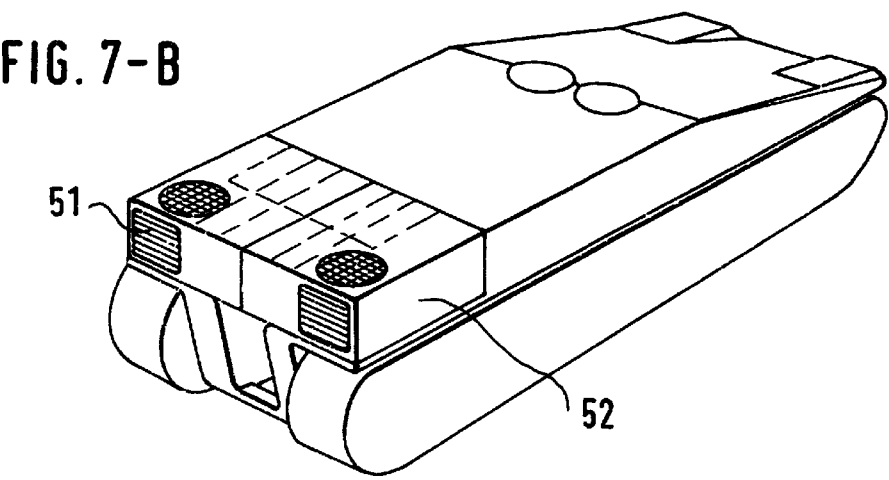
FIG. 7-B
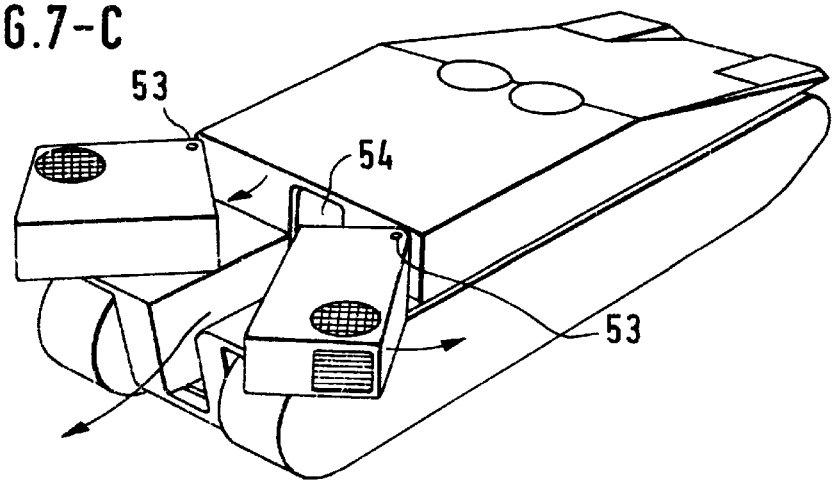
FIG.7-C

COMBAT VEHICLE WITH DIESEL-ELECTRIC DRIVE MECHANISM AND REAR HATCH

BACKGROUND OF THE INVENTION

The present invention concerns a combat vehicle (armored troop carrier) with both a diesel-electric drive mechanism and a hatch for the riflemen in the rear.

Armored troop carriers usually have a rear hatchway to allow the troops to get in and out rapidly in a protected area. The drive mechanism is accordingly usually forward to keep the rear free for the troops and the hatchway.

Forward drive mechanisms for combat vehicles have, however, turned out to be detrimental for many reasons, and it is now considered desirable to install such mechanisms in the rear of new models, both armored troop carriers and military tanks. Since on the other hand a hatchway at the rear remains just as unavoidably necessary for significant tactical reasons as ever, conventional drive mechanisms can no longer be considered in that the lack of space at the rear to accommodate them along with the hatchway will be immediately evident.

The Israeli armaments industry has attempted to resolve this conflict with a special type of transmission for the rear drive mechanisms employed in new models. This transmission when installed leaves room for a narrow passage between it and the wall of the vehicle. Rising about 50 cm above the bottom of this passage is a transmission tunnel that leads to the right-side drive wheel. The 60 cm of space above the tunnel is of course much too shallow to allow the troops to get in and out rapidly. To deepen the space, the Israelis have had recourse to raising the roof above the passage at the rear of the vehicle. The result is a triangular "gable" that the troops can leave the troop carrier through.

This design has several drawbacks. There is little room in spite of the elevated roof. The vehicle presents an extensive silhouette at the critical moment the troops are getting out of it and particularly at the point that is specifically at hazard. The troops have to jump over the transmission tunnel when getting in and out.

The object of the present invention is accordingly an ergonomically satisfactory and space-saving design for a combat vehicle (armored troop carrier) that will allow the troops to get in and out rapidly and easily even though the drive mechanism is not forward.

This object is attained in accordance with the present invention wherein the drive mechanism includes separate motors that drive the tracks and several current-generating diesel-electric aggregates, each in the form of a generator powered by a diesel engine, whereby the diesel-electric aggregates are positioned symmetrically to the longitudinal axis of the vehicle and above the track cover, leaving a passage between the inside of the vehicle and the hatch that is either open or that can be opened or expanded by moving the diesel-electric aggregates.

Advantageous embodiments and advanced versions of the invention will be evident from the following disclosure.

The object of the present invention is accordingly a combat vehicle with a rear hatch and a track powered by a diesel-electric drive mechanism in the rear. It is characterized in that the drive mechanism includes separate motors that drive the tracks and several current-generating diesel-electric aggregates, each in the form of a generator powered by an automobile-type diesel engine, whereby the diesel-electric aggregates are positioned symmetrically to the longitudinal axis of the vehicle and above the track cover, leaving a passage between the inside of the vehicle and the hatch that is either open or that can be opened or expanded by moving the diesel-electric aggregates.

Several diesel-electric aggregates can be distributed one after another along the vehicle in the form of a coherent train that is essentially as wide as a single aggregate and positioned immediately above the track cover on each side of the longitudinal axis of the vehicle. The diesel-electric aggregates on each side of the vehicle can all be accommodated in a housing that can be detached from the vehicle.

All the vehicle's diesel-electric aggregates in one embodiment of the present invention can be accommodated in a housing at the rear of the vehicle and extending essentially over its whole width. The passage can then be located below the housing and the housing can be lifted to a prescribed extent by a lifting mechanism.

One half of each diesel-electric aggregate in another embodiment can be accommodated in a housing at the rear. When this vehicle is ready to travel, the two housings symmetrical to the longitudinal axis of the vehicle communicate across the vehicle, the passage is below them, and each can be displaced horizontally outward to a prescribed extent by a displacement mechanism.

One half of each diesel-electric aggregate in still another embodiment can be accommodated in a housing at the rear. When the vehicle is ready to travel, the two housings symmetrical to the longitudinal axis of the vehicle communicate across the vehicle, the passage is below them, and each housing can be tilted outward to a prescribed extent around a horizontal axis at the lower outer edge of each housing by a tilting mechanism.

One half of each diesel-electric aggregate in still another embodiment, finally, can be accommodated in a housing at the rear of the vehicle. When the vehicle is ready to travel, the two housings symmetrical to the longitudinal axis of the vehicle communicate across the vehicle, the passage is below them, and each housing can be pivoted a prescribed angle around a vertical axis in the vicinity of the forward outer edge of the housing by a pivoting mechanism.

Many have for a long time thought about and attempted to redesign the drive mechanisms of combat vehicles on a diesel-electric basis. The point of departure has been an internal-combustion engine, preferably a diesel engine, to power a generator and distribute the resulting current over appropriate lines to motors that would drive a track. The major advantage of such a diesel-electric drive mechanism would be the possibility in accordance with the diesel-electric principle of installing separate and loose in the form of internal-combustion engines, generator, and motors the conventionally assembled components motor, transmission, and take-off that had always been integrated as a module into the vehicle and that accordingly generally dictated its dimensions, arriving at a more satisfactory utilization of the available space. The point of departure for previous approaches to diesel-electric vehicle had usually been one or no more than two engines accommodated in either the front or the rear (and sometimes at the middle). The size of these devices, however, still demanded considerable dimensions. Combat vehicles on the other hand always include a lot of corners and niches that could have provided potentially utilizable space except that they were not the right shape to accommodate large drive mechanisms. This situation suggested exploiting the space inside the vehicle better by dividing the internal-combustion engines into smaller components that could be distributed inside the vehicle where space was available.

A power of 1300 kW is obtained to drive a combat vehicle in accordance with the present invention not with a single engine but with for example ten small engines delivering 130 kW each. Such 130 kW engines are sold as automobile engines (turbodiesels) by various manufacturers. One example is the Daimler Benz OM 606 D 30 LA. These engines are small enough to be accommodated in areas inside combat vehicles that have previously been unavailable, and allow entirely new design concepts. The diesel-electric drive-mechanism theory behind the present invention also allows an electric generator to be flanged onto each engine, with their output being combined to supply motors for the tracks. In addition to the convenient spatial conditions ensured by such mechanisms there is an additional advantage of redundancy within the system. If one engine fails through either defect or damage in combat, the overall system will keep going although at decreased output. Furthermore, several small engines weigh less than a single large one and also cost less because they are manufactured in large numbers on an industrial scale.

Various embodiments of the present invention will now be specified by way of example with reference to the drawings, wherein:

BRIEF DESCRIPTION OF THE DRAWINGS

FIG. 4A is a perspective view of another embodiment of the combat vehicle in accordance with the present invention with its engine module removed, FIG. 4B is a perspective view of the vehicle illustrated in FIG. 4A with its engine module in place, FIG. 4C is a perspective view of the vehicle illustrated in FIG. 4A with its engine module lifted, FIG. 5A is a perspective view of still another embodiment of the combat vehicle in accordance with the present invention with its engine modules removed, FIG. 5B is a perspective view of the vehicle illustrated in FIG. 5A with its engine modules in place, FIG. 5C is a perspective view of the vehicle illustrated in FIG. 5A with its engine moduls displaced to each side, FIG. 6A is a perspective view of a fourth embodiment of the combat vehicle in accordance with the present invention with its engine modules removed, FIG. 6B is a perspective view of the vehicle illustrated in FIG. 6A with its engine modules in place, FIG. 6C is a perspective view of the vehicle illustrated in FIG. 6A with its engine modules tilted up, FIG. 7A is a perspective view of a fifth embodiment of the combat vehicle in accordance with the present invention with its engine modules removed, FIG. 7B is a perspective view of the vehicle illustrated in FIG. 7A with its engine modules in place, and FIG. 7C is a perspective view of the vehicle illustrated in FIG. 7A with its engine modules pivoted out around a vertical axis.

DETAILED DESCRIPTION OF THE INVENTION

Figure 1:
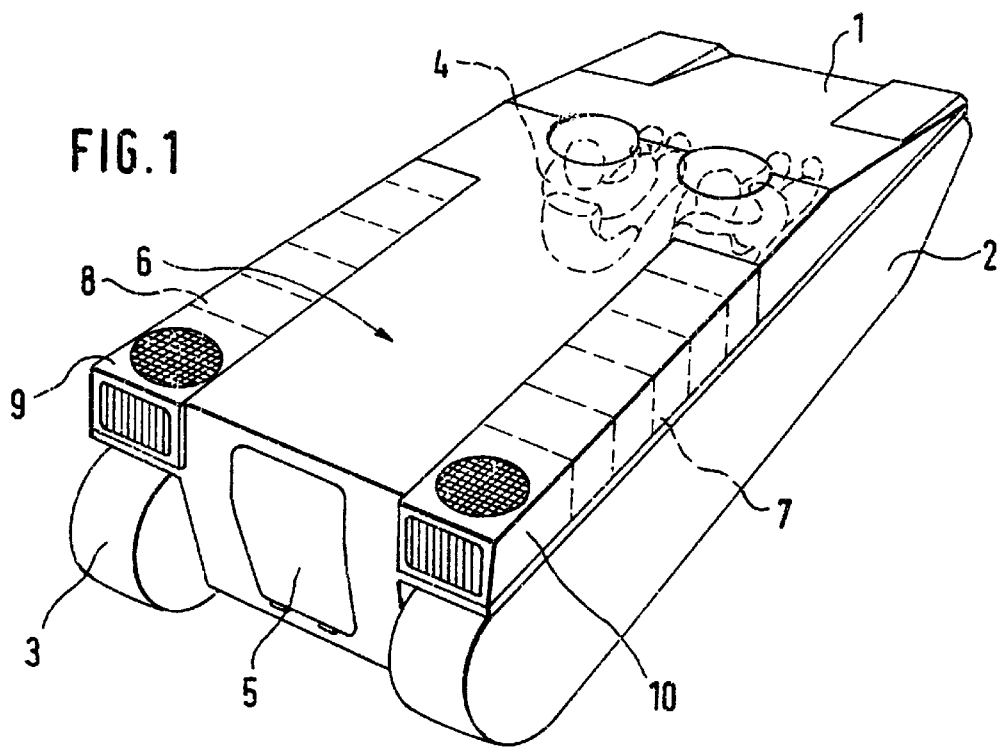
FIG. 1 is a perspective view of one embodiment of a combat vehicle in accordance with the present invention.

The combat vehicle 1 illustrated in FIG. 1 is manned by a skeleton crew of two. The weaponry is irrelevant to the present invention and has been left out for simplicity's sake. The vehicle has a right-side track 2, a left-side track 3, a crew 4, a hatch 5, a roofed troop compartment 6, a right-side engine train 7, a left-side engine train 8, a ventilator 9, and an exhaust 10.

Figure 2:
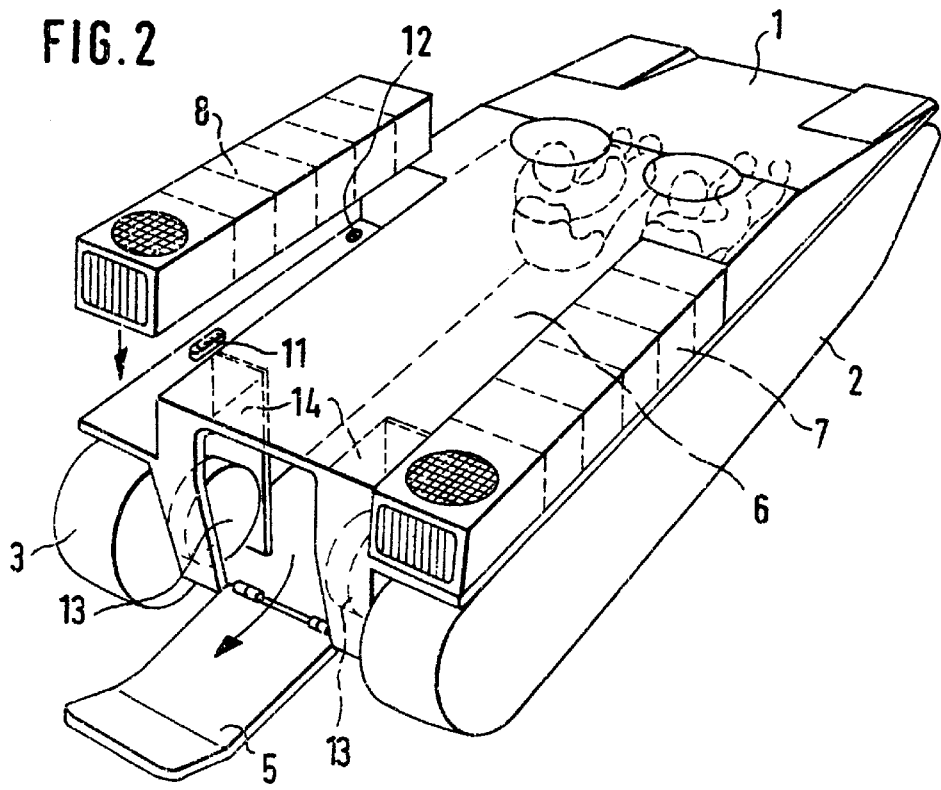
FIG. 2 is a similar but partly exploded view of the same vehicle.

Further evident from FIG. 2 are the folded-down hatch 5, the lifted left-side engine train 8, an electric plug 11, a fuel intake 12, motors 13 to the right and to the left, and electronic controls 14 for the drive mechanisms.

Each train 7 and 8 includes five adjacent turbodiesel engines (e.g. Daimler Benz OM 606 D 30 LA's), each delivering approximately 130 kW, accommodated above the track cover. Flanged to each engine is a generator. The generators supply their combined outputs to motors 13 by way of electronic controls 14. The motors drive tracks 2 and 3. There is enough room between the motors for hatch 5, and the troops can easily enter and leave troop compartment 6 through the hatchway. The arrangement is particular practical if four engines are employed instead of two. Two additional engines can be accommodated forward. The four engines as a whole will then take up less space and the hatchway can be larger.

As will be evident from FIG. 2, each train 7 and 8 can be removed from the vehicle separately and in one piece (engines, generators, ventilators, and exhausts) for replacement or maintenance. Any train can be mounted on either the left or the right side.

Figure 3:
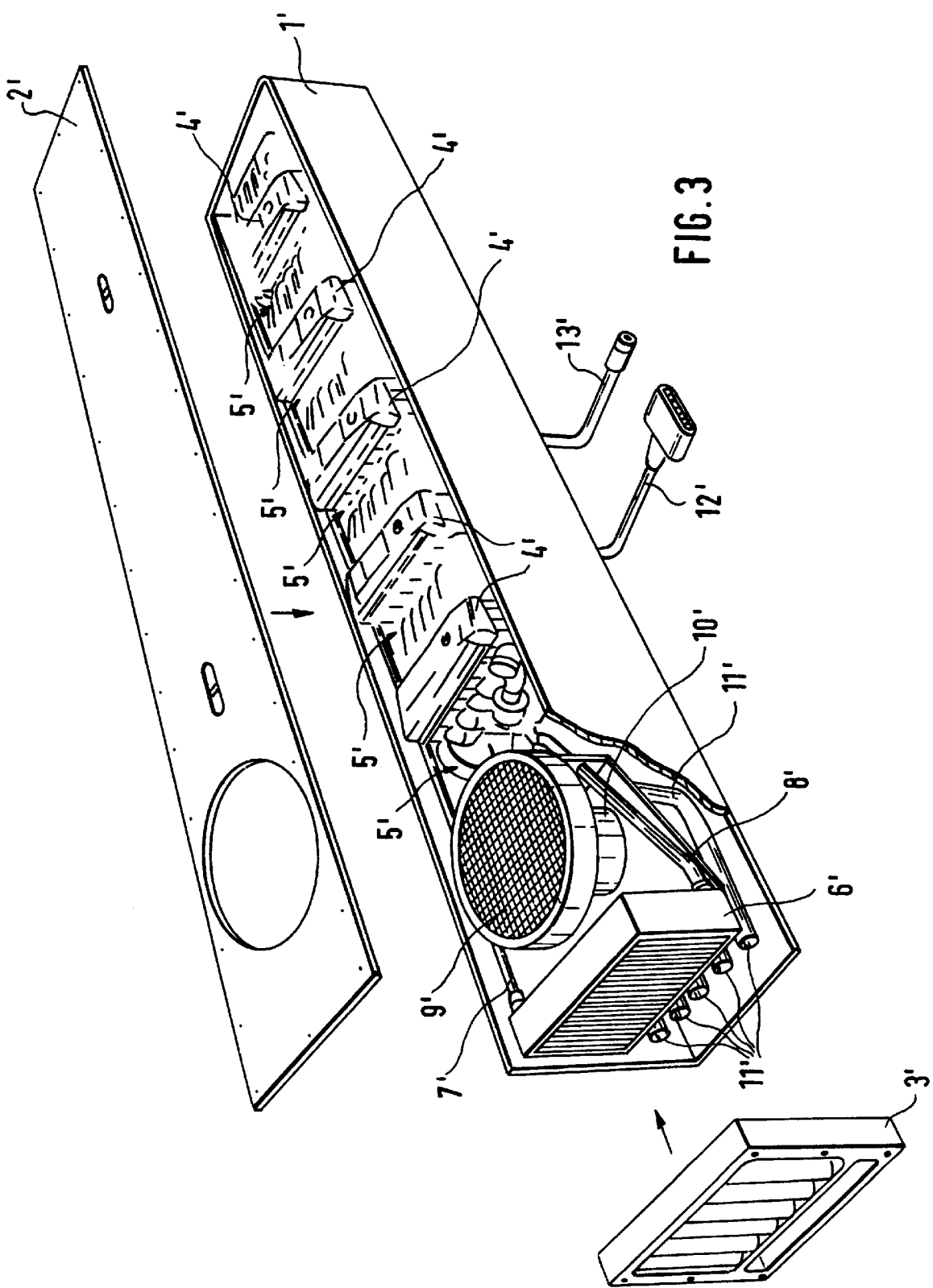
FIG. 3 is a larger-scale partly exploded view of the engine train from the vehicle illustrated in FIGS. 1 and 2.

The engine housing 1' illustrated in FIG. 3 has a top 2', a cooler grill 3', engines 4', generators 5', a cooler 6' with an intake line 7' and an outlet line 8', a ventilator 9', a ventilator motor 10', an exhaust line 11', power and control cables 12' with connectors, and a fuel line 13' with a rapid-action connector.

This engine module is one example of the possible arrangements, and it is of course alternatively possible to array the engines one behind another, next to one another, or in two rows to achieve drive-mechanism aggregate embodiments that will integrate more practically into other designs.

FIGS. 4A through 4C illustrate an embodiment of the present invention wherein the individual engines are grouped at the rear of the vehicle instead of being distributed in trains along its sides. The resulting engine module 21 can easily be removed for maintenance and can easily be lifted by a cylinder 22 to provide a passage 23 for the troops to get in and out by way of a hatchway 24.

FIGS. 5A through 5C illustrate another embodiment of the present invention wherein not one but two engine modules, each providing half the output, are mounted on the rear of the vehicle. Each module 32 slides along rails and can be displaced to the side by hydraulic cylinders in the direction indicated by arrow S, providing a passage 34 for the troops to get in and out when necessary.

FIGS. 6A through 6C illustrate a third embodiment of the present invention that differs from the one illustrated in FIGS. 5A through 5C in that engine modules 41 and 42 can be tilted up by hydraulic cylinders 43, providing a passage for the troops to easily get in and out.

FIGS. 7A through 7C illustrate a fourth embodiment of the present invention that differs from the ones illustrated in FIGS. 4A through 6C in that engine modules 51 and 52 can be pivoted out around a vertical axis 53 to provide a passage 54 for the troops to get in and out.

The troop compartment 6 illustrated in FIGS. 1 and 2 can be accessed by way of hatch 5, which can be folded down or to one side like a door. The seating inside troop compartment 6 can be arranged to allow the troops to sit facing the front, the rear, or one side for example.

Vehicles in accordance with the present invention have many advantages. The hatchway is wide even though the engine modules are at the rear. Since the engine trains feature redundancy, the vehicle can travel even if one train is put out of commission by failure or damage in combat. If engines within a train fail, at least some power will still be available. Drive-mechanism components can be interchanged (due to the modular design). The capacity of the troop compartment will be large because the major mechanisms are located outside it. The vehicle will be less expensive because it employs standard automobile-type drive mechanisms.

What is claimed is:

1. A combat vehicle comprising: a rear hatch for accessing an inside of the vehicle; two tracks having track covers; a diesel-electric drive mechanism including separate motors in the rear of the vehicle for driving the tracks and a plurality of current-generating diesel-electric aggregates, each comprising a generator powered by a diesel engine; wherein the diesel-electric aggregates are positioned symmetrically with respect to a longitudinal axis of the vehicle and above the track covers to one of leave an open passage between the inside of the vehicle and the hatch and leave an openable passage between the inside of the vehicle and the hatch by moving the diesel-electric aggregates.

2. The combat vehicle as in claim 1, wherein the diesel engines are turbodiesel engines.

3. The combat vehicle as in claim 1, wherein the plurality of diesel-electric aggregates are distributed one after another along the vehicle in a coherent train that is substantially as wide as a single aggregate and are positioned immediately above the track cover on each side of the longitudinal axis of the vehicle.

4. The combat vehicle as in claim 3, wherein the dieselelectric aggregates on each side of the vehicle are in a housing that is detachable from the vehicle.

5. The combat vehicle as in claim 4, further comprising an electrically powered cooler for the aggregates in a each housing and mounted on one end of each housing.

6. The combat vehicle as in claim 5, further comprising an exhaust system integrated into each cooler.

7. The combat vehicle as in claim 1, wherein all of the diesel-electric aggregates are in a housing at the rear of the vehicle which extends substantially over the entire width of the vehicle, and wherein the passage is below the housings and is openable by lifting the housing by a given extent by a lifting mechanism.

8. The combat vehicle as in claim 1, wherein the diesel-electric aggregates are disposed in two housings at the rear of the vehicle which are disposed symmetrically about the longitudinal axis of the vehicle when ready to travel, wherein each housing is horizontally displaceable and wherein the passage is below the two housings and is openable by displacing the housings horizontally outwardly by a given extent by a displacement mechanism.

9. The combat vehicle as in claim 1, wherein the diesel-electric aggregates are disposed in two housings at the rear of the vehicle which are disposed symmetrically about the longitudinal axis of the vehicle when ready to travel, wherein each housing is tiltable about a horizontal axis at a lower edge of each housing and wherein the passage is below the two housings and is openable by tilting the housings outwardly around the horizontal axes by a given extent by a tilting mechanism.

10. The combat vehicle as in claim 1, wherein the diesel-electric aggregates are disposed in two housings at the rear of the vehicle which are disposed symmetrically about the longitudinal axis of the vehicle when ready to travel, wherein each housing is pivotable around a vertical axis in the vicinity of a forward outer edge of the housing and wherein the passage is below the two housings and is openable by pivoting the housings outwardly by a given extent by a pivoting mechanism.

* * * * *